Sept. 1, 1970   R. G. TESSMER, JR   3,526,310
CAP ARRANGER
Filed Sept. 6, 1968   2 Sheets-Sheet 1
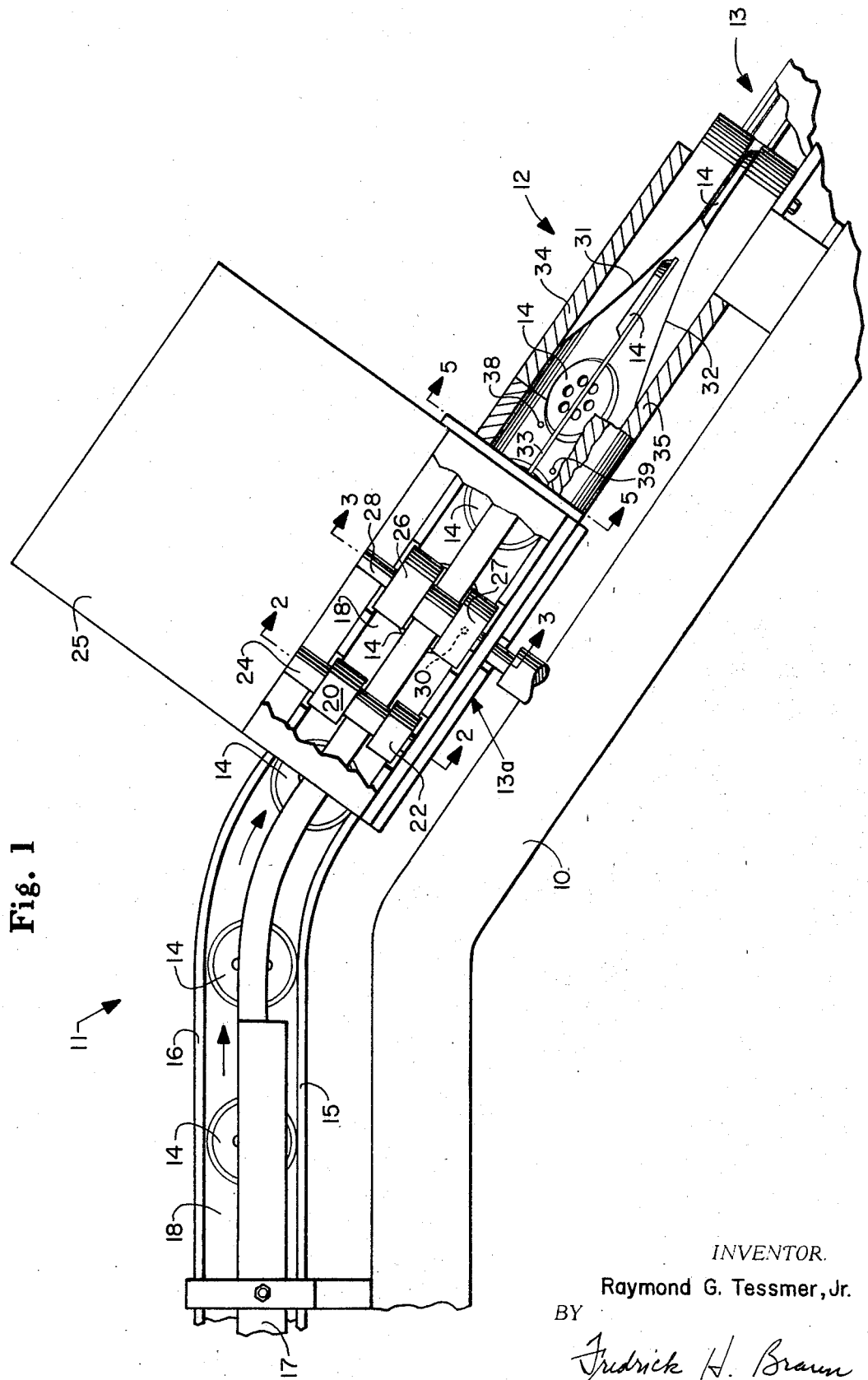
INVENTOR.
Raymond G. Tessmer, Jr.
BY
Fredrick H. Braun
ATTORNEY Sept. 1, 1970    R. G. TESSMER, JR    3,526,310
CAP ARRANGER
Filed Sept. 6, 1968    2 Sheets-Sheet 2
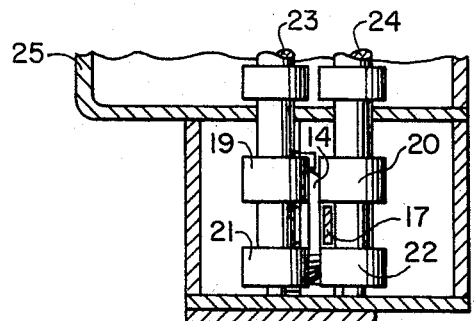
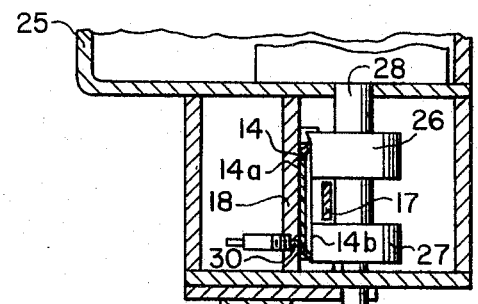
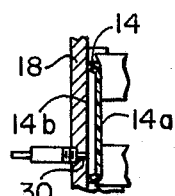
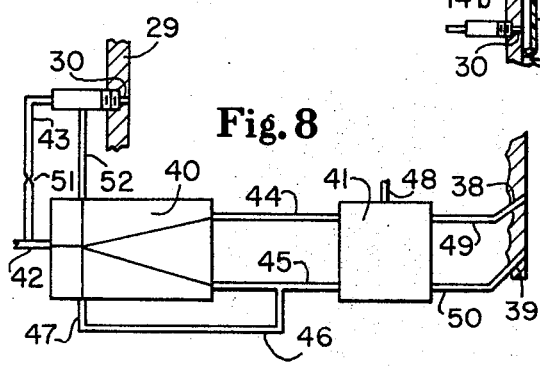
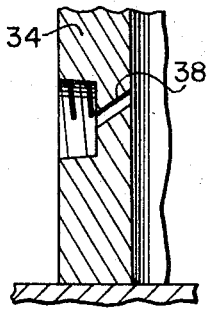
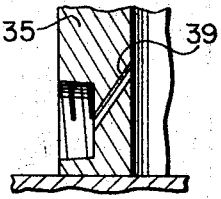
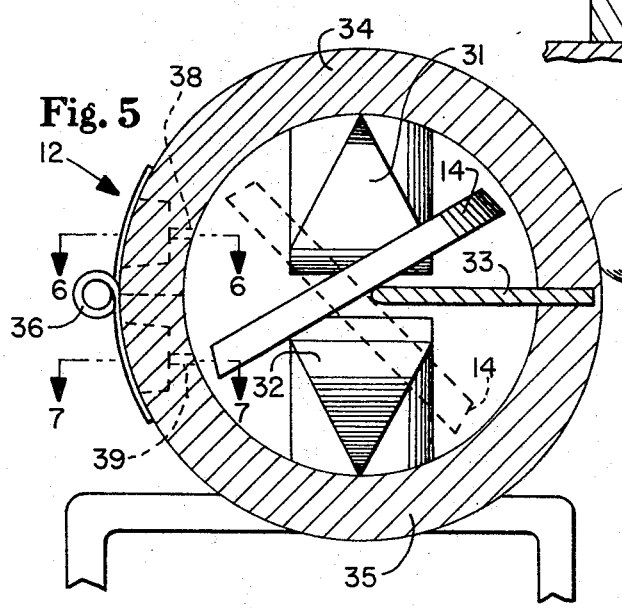
INVENTOR.
Raymond G. Tessmer, Jr.
BY
Frederick H. Braun
ATTORNEY United States Patent Office 3,526,310
Patented Sept. 1, 1970

3,526,310
CAP ARRANGER
Raymond G. Tessmer, Jr., Cincinnati, Ohio, assignor to The Procter & Gamble Company, Cincinnati, Ohio, a corporation of Ohio
Filed Sept. 6, 1968, Ser. No. 758,072
Int. Cl. B65g 47/24
U.S. Cl. 198—33    10 Claims

ABSTRACT OF THE DISCLOSURE

An apparatus for arranging caps being fed through a chute at high rates so that each cap is discharged with the same orientation. A sensing device is provided to determine the initial orientation of each cap at the inlet chute and for feeding a signal to a suitable control mechanism. The control mechanism operates one of two turning jets in a turning chamber located downstream of the inlet chute such that each successive cap is rotated into the same orientation as it is fed to an exit chute.

BACKGROUND OF THE INVENTION

The invention relates to a cap arranger for use in conjunction with a high speed sorter and capper on a filling line. More particularly, it relates to a device of this character in which caps can be oriented at high rates while feeding them through a chute.

In broad sense, the prior art contains numerous instances of devices used to arrange caps while feeding them in single file order through a chute. The caps are initially fed into the chute in random fashion such that the top surface of each cap faces in one of two directions. Various kinds of sensing devices have been suggested such as star wheel, pin wheels, magnets and the like for detecting cap orientation prior to their entry into a turning chamber wherein each cap is oriented so that its top surface is in the same attitude as all the preceeding caps. Devices of this kind are suitable for slow speed operation and particularly for operations in which caps are deliberately fed at substantial spaced intervals to allow sufficient time for the slow acting mechanical sensing means to determine the orientation of the cap and then properly pre-orient the cap as it is fed into the turning chamber. Previous devices have been unable to cope with the feeding of caps at high rates in the order of four hundred caps per minute and above without becoming jammed and thus ultimately resulting in a completely inefficient operation.

The principal object of the present invention is the provision of a cap arranging mechanism to obviate the above problems.

Another object of the invention is the provision of a cap arranger that is capable of efficient operation when feeding caps at rates as high as 600 per minute.

Still another object of the invention is the provision of a cap arranger that is effective and efficient and will operate continuously for long periods without any possibility of jamming or otherwise effecting the overall efficiency of the filling line which it serves.

SUMMARY OF THE INVENTION

The nature and substance of the invention can be briefly summarized as comprising a cap arranger including an inlet chute, an exit chute and a turning chamber interposed between said inlet and exit chutes. Sensing means are provided for detecting the orientation of successive caps being passed through the inlet chute and a pair of turning jets are mounted in the turning chamber to be selectively actuated for the purpose of turning each cap into its proper orientation. A control device is provided which is actuated by the sensing means to control the output of the turning jets. The control device actuates one of the two turning jets as each cap passes by the sensing means whereby each cap is rotated as it passes through the turning chamber so that it is properly oriented as it moves into the exit chute.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 1 is a fragmentary side elevation partially in cross section illustrating the overall arrangement of parts of the preferred cap arranger of the invention.

FIG. 2 is a fragmentary cross section of the metering wheels taken on the line 2—2 of FIG. 1.

FIG. 3 is a fragmentary cross section of the sensing jet and accelerating wheels taken on the line 3—3 of FIG. 1.

FIG. 4 is a fragmentary cross section similar to FIG. 3 but reduced in size to illustrate only a cap passing the sensing jet in opposite orientation with respect to the cap shown in FIG. 3.

FIG. 5 is a fragmentary cross section illustrating the entry into the turning chamber taken on the line 5—5 of FIG. 1.

FIG. 6 is a fragmentary cross section of the upper turning jet taken on the line 6—6 of FIG. 5.

FIG. 7 is a fragmentary cross section of the lower turning jet taken on the line 7—7 of FIG. 5.

FIG. 8 is a schematic illustration of a suitable fluidic control for the operation of the cap arranger.

DESCRIPTION OF THE PREFERRED EMBODIMENT

The overall assembly and arrangement of the several parts of the cap arranger of the present invention is illustrated in FIG. 1. The entire device is properly supported by the hollow tubular member 10, the ends of which are adequately secured to a suitable foundation or other structural members. The major elements of the arranger comprise an inlet chute 11, a turning chamber 12 and an exit chute 13. A sensing device or means 13a is positioned at the terminus of the inlet chute 11 to detect the orientation of the caps 14 prior to their entry into the turning chamber 12.

The caps 14 have a relatively large diameter to height ratio. From an examination of FIGS. 3 and 4 it will be apparent that the caps 14 are composed of a solid wall comprising one end which will be referred to herein as the top 14a of the cap; the cap 14 includes a depending peripheral skirt which defines an open end of the cap 14 which will be referred to herein as the bottom 14b of the cap. The caps 14 are fed to the inlet chute 11 from a suitable sorter of the kind that is well known to persons skilled in the art.

The invention has been found to be particularly useful in arranging plastic caps 14 which are made by the injection molding process. The material of the cap 14 may be any of the well known plastics, such as polyethylene or the like. The caps 14 have relatively thin walls which makes them somewhat difficult to handle because of their inherent flexibility. In particular, the invention has been used with a great deal of success in handling plastic caps 14 of the kind that are attached to the top of plastic containers for household cleansers in which the top 14a of the cap is provided with a plurality of dispensing openings. In the manufacture of such containers, the caps are properly oriented and then placed individually on successive container openings whereupon the cap can be attached permanently by spin welding or some other suitable process. It will be understood, however, that other kinds of caps can be handled by the cap arranger of the invention such as metal caps having threads or lugs or virtually any kind of cap that is mechanically fed for subsequent attachment to a container.

The caps 14 are delivered in single file order from a suitable source and fed into the inlet chute 11. They are retained within the chute 11 by the lower guide 15, the upper guide 16, the guide rail 17 and backplate 18.

In order to provide an adequate time period between successive caps, metering wheels are provided on opposite sides of the inlet chute 11 as best illustrated in FIGS. 1 and 2. The metering wheels are mounted in cooperating pairs 19, 20 and 21, 22 on the shafts 23 and 24. It will be apparent that the spacing between each pair of metering wheels 19, 20 and 21, 22 is adjusted so that successive caps 14 are engaged by the peripheral surfaces of the metering wheels to be positively moved forward in suitable spaced relationship. In a preferred embodiment, the metering wheels are driven such that their peripheral surfaces have a speed of about 70 feet per minute when feeding caps having a diameter of about 2 inches at a rate of 420 per minute. The shafts 23 and 24 are positively driven in contrarotating relationship through conventional gearing in the gear box 25, the details of which are unnecessary to a full understanding of the present invention. A conventional clutch arrangement is interposed in the drive train for the shafts 23 and 24 to allow intermittent rotation of the metering wheels in response to the demand of the mechanism to which the caps are being fed.

Successive caps 14 are fed forward by the metering wheels 19, 20 and 21, 22 whereupon they are engaged by a pair of accelerating wheels and simultaneously passed over a sensing jet. As best illustrated in FIGS. 1 and 3, the caps 14 are engaged by the accelerating wheels 26 and 27 both of which are mounted on the shaft 28 which is directly driven by a motor (not shown) located in the gear box 25. The accelerating wheels 26 and 27 are constantly rotated in this manner regardless of cap demand at the output of the arranger.

From an examination of FIG. 3, it will be clear that the caps 14 pass between the accelerating wheels 26, 27 and the backplate 18. A sensing jet 30 passes through the backplate 18 approximately opposite the axis of the shaft 28. Pressurized air is continuously passed to the sensing jet 30 from a control which will be described in greater detail hereinafter. The accelerating wheels are rotated such that their peripheral surfaces have a speed of about ten times the peripheral surface speed of the metering wheels 19, 20 and 21, 22 in order to increase the spacing between successive caps 14 thus assuring individual feed of caps to the turning chamber 12 to permit unhindered rotation therein.

The turning chamber 12 is generally cylindrical in configuration and its components are best illustrated by making reference to FIGS. 1 and 5 of the drawings. The turning chamber is suitably supported downstream of the inlet chute 11 and preferably includes an upper guide 31, a lower guide 32 and a turning vane 33. Each cap entering the turning chamber is turned approximately 90° so that it leaves the turning chamber with its top 14a uppermost as it enters the exit chute 13. In a preferred embodiment, the turning chamber 12 may be constructed to include an upper half 34 and a lower half 35. The upper half 34 and lower half 35 may be hinged at 36. A handle 37 can be attached to the upper half 34 as an aid in pivoting the latter on the hinge 36 so that the turning chamber can be opened for inspection or for any other purpose.

As will be noted, the upper half 34 of the turning chamber is provided with an upper turning jet 38 which is preferably inclined somewhat (see FIG. 6) with respect to the line normal to the path of movement of the caps 14. Similarly, a lower turning jet 39 (see also FIG. 7) passes through wall of the lower half 35 of the turning chamber 12. The lower turning jet 39 is also inclined and perhaps even to a somewhat greater degree to the line normal to the path of movement of the caps 14 through the turning chamber.

Referring again now to FIGS. 1 and 5, it will be apparent that the successive caps 14 are fed into the turning chamber 12 by the accelerating wheels 26 and 27 such that their long dimension is essentially vertical as they enter the turning chamber 12. Thus when either of the air jets 38 or 39 acts on a cap 14 passing through the turning chamber 12, the cap will be rotated approximately 90° about the turning vane 33 and then fed forwardly between the guides 31 and 32 for entry into the exit chute 13 with its top 14a uppermost. Thus, the direction of rotation of each cap 14 depends entirely on which of the turning jets 38 or 39 is operated as the particular cap 14 comes into the turning chamber 12.

A suitable control is provided for actuating one of the turning jets 38 or 39 as each cap 14 passes through the turning chamber 12. The control is illustrated schematically in FIG. 8. The control includes a fluidic flip-flop logic element 40 and a four way pneumatic valve 41. The logic element 40 has low pressure air (between about 3 and 15 p.s.i.g.) continuously supplied thereto through the inlet 42. The low pressure air is continuously supplied to the sensing jet 30 (see also FIGS. 3 and 4) by means of the conduit 43 having an orifice 51 therein. Output conduits 44 and 45 are connected from the logic element 40 to the four way valve 41. A time delay conduit 46 leads from the conduit 45 to the inlet 47 of the logic element 40. A control signal conduit 52 is connected between the sensing jet 30 and the upper control input on the fluidic element 40.

High pressure air (between about 20 p.s.i.g. and 60 p.s.i.g.) is supplied to the four way valve 41 through the conduit 48. The four way valve 41 includes output conduits 49 and 50 which are in communication, respectively, with the upper turning jet 38 and the lower turning jet 39 located in the turning chamber 12.

Operation of the control means illustrated in FIG. 8 is carried out by continuously feeding low pressure air to the logic element 40 by means of the inlet 42 while simultaneously supplying high pressure air continuously to the four way valve 41. Under normal circumstances low pressure air passes through the conduit 43 wherein it is reduced in pressure by the orifice 51. Air from this source issues continuously from the sensing jet 30. The low pressure air also passes to the four way valve 41 through the output conduit 44. In these circumstances the four way valve 41 is set so that the high pressure supply air entering through the conduit 48 is issued through the conduit 50 so that it is ejected from the lower turning jet 39. Thus when a cap 14 passes to the accelerating wheels 26, 27 with its bottom 14b facing the sensing jet 30 as illustrated in FIG. 4, there is no interruption or upset of control air issuing from the sensing jet 30. As a consequence the control means will continue to send high pressure air to the lower turning jet 39 so that the cap 14 on arrival in the turning chamber 12 will be turned by the jet 39. As illustrated in FIG. 5, the jet 39 will cause the cap 14 to turn over the vane 33 (in the manner shown by the broken cap outline) and be passed into the exit chute 13 with its top 14a uppermost.

On the other hand, if a cap 14 passes the sensing jet 30 in the attitude illustrated in FIG. 3, the low pressure air discharged from the jet 30 will be momentarily stopped. This creates a pressure increase in conduit 52 which acts as a signal in the fluidic flip-flop element 40 and causes flow to switch from the output conduit 44 to the output conduit 45. This causes the four way valve 41 to shift high pressure air flow from the output conduit 50 to the output conduit 49. As a consequence, high pressure air will be discharged from the upper turning jet 38 instead of from the lower turning jet 39. Air discharge from the upper turning jet 38 causes the cap 14 to be turned over the vane 33 (in the manner shown by the full line cap outline of FIG. 5) so that the cap 14 arrives at the exit chute 13 with the same orientation as all of the other caps 14.

The control remains in this position only until the cap leaves the turning chamber 12 and before the next cap arrives at the sensing jet 30. During this short time interval, the fluidic element 40 is automatically switched back to supplying air to the control conduit 44. This is accomplished by the time delay conduit 46 which bleeds air from the output conduit 45 to the inlet 47 so that flow to the output conduit 45 only continues for a predetermined time sufficiently long for the passage of one cap through the turning chamber 12. Thus, the control always returns automatically to its original output prior to the passage of each cap past the sensing jet 30 wherein the lower turning jet 39 has high pressure air issuing therefrom. The control will remain in this condition so long as successive caps are fed past the sensing jet 30 in the orientation shown in FIG. 4. On the other hand, as soon as a cap is in the reverse position, as shown in FIG. 3, the sensing jet 30 will cause the control to go through the cycle aforesaid such that the high pressure air will be issued from the upper turning jet 38 for a sufficient time interval to properly orient that particular cap. The control as described operates continuously and automatically and the particular details of the various elements will be familiar to those skilled in the art.

While the invention has been described heretofore as operated with a suitable pneumatic control system it will be apparent that various forms of mechanical, hydraulic and/or electrical actuating or control devices may be substituted or employed to actuate the turning jets of the invention and that the actuating or operating circuits for these components will vary accordingly. However, with these teachings as a guide, the necessary control means and circuitry for carrying out the objectives of the invention will be readily apparent to the skilled worker in the art.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed as new is:
1. A cap arranger comprising:
 (a) An inlet chute, an exit chute, and a turning chamber interposed between said inlet and said exit chutes,
 (b) sensing means for detecting the orientation of successive caps passing through said inlet chute,
 (c) a pair of turning jets in said turning chamber,
 (d) means for selectively actuating one of said jets in response to the orientation of each cap as detected by said sensing means, said turning jets rotating each cap passing through said turning chamber so that all caps are similarly oriented when fed to said exit chute.

2. A cap arranger as claimed in claim 1 wherein said selective actuating means includes a fluidic flip-flop logic element in series with a four way valve, said logic element being responsive to said sensing means to control the output of said four way valve to one of said turning jets.

3. A cap arranger as claimed in claim 1 wherein said sensing means includes a sensing jet in said inlet chute which discharges low pressure air to detect the orientation of each successive cap moving down said inlet chute.

4. A cap arranger as claimed in claim 3 wherein said selective actuating means includes a fluidic flip-flop logic element in series with a four way valve, said logic element being responsive to said sensing jet to control the output of said four way valve to one of said turning jets.

5. A cap arranger as claimed in claim 1 including cooperating metering wheels in said inlet chute mounted in advance of said sensing means to assure an adequate time period between successive caps.

6. A cap arranger as claimed in claim 5 including an accelerating wheel mounted in proximity to said sensing means, the peripheral speed of said accelerating wheel being substantially greater than the peripheral speed of said metering wheels in order to increase the spacing between successive caps and thus assuring individual cap feed through the turning chamber.

7. A cap arranger as claimed in claim 6 wherein the peripheral speed of said accelerating wheel is about ten times the peripheral speed of said metering wheels.

8. A cap arranger as claimed in claim 4 including cooperating metering wheels in said inlet chute mounted in advance of said sensing means to assure an adequate time period between successive caps.

9. A cap arranger as claimed in claim 8 including an accelerating wheel mounted in proximity to said sensing means, the peripheral speed of said accelerating wheel being substantially greater than the peripheral speed of said metering wheels in order to increase the spacing between successive caps and thus assuring individual cap feed through the turning chamber.

10. A cap arranger as claimed in claim 9 wherein the peripheral speed of said accelerating wheel is about ten times the peripheral speed of said metering wheels.

References Cited

UNITED STATES PATENTS 2,665,005  1/1954  Mundy.
3,392,816  7/1968  Cox.

ROBERT G. SHERIDAN, Primary Examiner

G. F. ABRAHAM, Assistant Examiner

U.S. Cl. X.R.

221—173